United States Patent
Ueda

(10) Patent No.: US 6,172,681 B1
(45) Date of Patent: *Jan. 9, 2001

(54) COLOR ADJUSTMENT AND CONVERSION METHOD

(75) Inventor: Masashi Ueda, Nagoya (JP)

(73) Assignee: Brother Kogyo Kabushiki Kaisha, Nagoya (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/751,554

(22) Filed: Nov. 18, 1996

(30) Foreign Application Priority Data

Nov. 17, 1995 (JP) .................................... 7-300196

(51) Int. Cl.$^7$ ....................................... G06T 11/40
(52) U.S. Cl. .............................................. 345/431
(58) Field of Search ........................ 345/431; 358/518, 358/521; 382/162, 167, 270

(56) References Cited

U.S. PATENT DOCUMENTS

| | | | |
|---|---|---|---|
| 5,742,296 | * 4/1998 | Yamada et al. ................... | 345/431 |
| 5,742,520 | * 4/1998 | Uchikawa et al. ................ | 364/526 |
| 5,745,119 | * 4/1998 | Parchem et al. .................. | 345/431 |
| 5,819,018 | * 10/1998 | Sugiyama ......................... | 345/431 |
| 5,835,243 | * 11/1998 | Mori ................................ | 358/518 |
| 5,838,333 | * 11/1998 | Matsuo ............................ | 345/431 |
| 5,903,275 | * 5/1999 | Guay ............................... | 345/430 |
| 5,943,059 | * 8/1999 | Satoh et al. ...................... | 345/431 |
| 5,949,427 | * 9/1999 | Nishikawa et al. ............... | 345/431 |

\* cited by examiner

*Primary Examiner*—Mark R. Powell
*Assistant Examiner*—Motilewa Good-Johnson
(74) *Attorney, Agent, or Firm*—Oliff & Berridge, PLC

(57) ABSTRACT

The user determines his/her desired color state in accordance with the color maps prepared in accordance with the color system corresponding to the human visual sense. The LUT characteristic values Lmin, amin, bmin, astep, and bstep are adjusted into adjusted values L'min, a'min, b'min, a'step, and b'step based on the user's designated color adjustment amounts ΔL, ΔC, ΔRG, and ΔYB. Then, based on the adjusted LUT characteristic values and the inputted Lab color data (Lx, ax, bx), discrimination number sets (Lgrid, agrid, bgrid) are determined for eight lattice points surrounding the inputted color data. With using CMY data sets (Ci, Mi, Yi) for the eight lattice points, an interpolation calculation is achieved to calculate a CMY control data set (Cx, Mx, Yx) for the inputted color data set (Lx, ax, bx).

31 Claims, 7 Drawing Sheets

| L*<br>(Lgrid) | a*<br>(agrid) | b*<br>(bgrid) | C<br>(Ci) | M<br>(Mi) | Y<br>(Yi) |
|---|---|---|---|---|---|
| 0 | 0 | 0 | C 1 | M 1 | Y 1 |
| 0 | 0 | 1 | C 2 | M 2 | Y 2 |
| 0 | 0 | 2 | C 3 | M 3 | Y 3 |
| . | . | . | . | . | . |
| . | . | . | . | . | . |
| . | . | . | . | . | . |
| m | m | m | C n | M n | Y n |

COLOR ADJUSTMENT AND CONVERSION METHOD

BACKGROUND OF THE INVENTION

1. Field of the Invention

The present invention relates to a method for converting color data from a certain colorimetric system into another colorimetric system.

2. Description of the Related Art

When a user picks up an image by an image pick up device, the user sometimes desires to print out the picked up image with a color printer. Color data produced by the image pick up device is generally defined in an RGB colorimetric system. In order to print out the color data (referred to as RGB color data) by the color printer, the RGB color data has to be converted into CMY color data defined in a CMY colorimetric system.

SUMMARY OF THE INVENTION

It is conceivable that in order to subject the RGB color data to the conversion operation, the RGB color data is first transferred to a computer. The user then adjusts the RGB color data while observing the color state of the RGB color data as being displayed on a CRT display provided to the computer. The computer then converts the user's adjusted RGB color data into CMY color data in accordance with a theoretical relationship between the RGB colorimetric system and the CMY colorimetric system. In this case, however, table (LUT) in which a plurality of CMY parameters defined in the CMY colorimetric system are stored in correspondence with a plurality of Lab parameters defined in the L*a*b* colorimetric system. Each CMY parameter is determined as control data that can control the color printer to reproduce a color the same as that defined by a corresponding Lab parameter. The look up table is therefore prepared in accordance with the characteristic of the color printer. Accordingly, the computer converts the Lab color data into CMY color data while using the Lab parameters and the CMY parameters stored in the look up table.

According to the above-described color conversion method, however, the color state is adjusted in the HVC colorimetric system. Therefore, the original color data has to be converted four times: (1) from the RGB system into the L*a*b* system; (2) from the L*a*b* system to the HVC system; (3) from the HVC system back to the L*a*b* system; and (4) from the L*a*b* system into the CMY system. The final conversion is performed easily with using the look up table. However, the first through third conversions include calculations with square roots, cube roots, reverse trigonometric functions, and the like. Accordingly, it takes a long time to perform the respective conversion operations. Because each color image is comprised of a plurality of sets of color data (i.e., a plurality of picture elements), it there is a possibility that the obtained CMY color data may not accurately reproduce the color displayed on the CRT display. This problem occurs due to the respective characteristics of the image pick up device, the CRT display, the color printer, and the color inks used by the color printer.

In order to solve this problem, the computer may be controlled to convert the original RGB color data first into Lab color data defined in a L*a*b* colorimetric system which is representative of a uniform color space. The computer further converts the Lab color data into HVC color data defined in a Munsell colorimetric system. The Munsell colorimetric system indicates color in accordance with human's visual sense. The Munsell colorimetric system will be referred to as a HVC colorimetric system hereinafter because the Munsell colorimetric system indicates color by hue data H, value (lightness) data V, and chroma (saturation) data C. The user adjusts the HVC color data in the HVC colorimetric system. The user can therefore easily adjust the HVC color data into his/her desired color state because the HVC system is defined in accordance with the human's visual sense. When this adjustment is completed, the HVC color data is reconverted into Lab color data in the L*a*b* system.

The computer previously stores therein a look up takes a very long time to process the entire image. Especially when the user performs the color adjustment operation many times, the entire processing time length will become quite long.

In order to shorten the processing time length, it is conceivable to convert color data only through two conversion processes: (1) from the RGB system into the L*a*b* system; and (2) from the L*a*b* system into the CMY system. The final conversion is performed with using the look up table. When the user desires to adjust the color state of the color data, the user may input color adjustment amounts indicative of his/her desired adjustment degrees defined in the HVC colorimetric system. In accordance with the inputted color adjustment amounts, the computer changes all the parameters stored in the look up table. The final conversion is then performed with the thus adjusted look up table. This conceivable method can perform an entire process within a shorter period of time because this method does not include the conversion steps between the L*a*b* system and the HVC system.

It is noted, however, that the data amount of the look up table is relatively large. Accordingly, it still takes a relatively long time to change all the parameters in the look up table into newly-adjusted parameters. Every time the user sets his/her desired color adjustment amounts, the computer has to change all the parameters in the look up table. The computer is required to have a relatively large memory area for storing the thus newly-adjusted look up table.

It is therefore, an object of the present invention to overcome the above-described drawbacks, and to provide an improved color conversion method wherein it becomes unnecessary to change the look up table and which can still perform an entire conversion operation within a short period of time.

Another object of the present invention is to provide an improved color conversion device which can perform the improved color conversion method.

In order to attain these and other objects, the present invention provides a color converting method for converting color data from a first colorimetric system into a second colorimetric system, the method comprising the steps of: inputting a desired color adjustment amount; changing, dependently on the inputted color adjustment amount, a characteristic value indicative of relationship between first parameters defined in a first colorimetric system and second parameters defined in a second colorimetric system stored in a predetermined table; and converting color data, defined in the first colorimetric system, into color data in the second colorimetric system, in accordance with the table and the changed characteristic value.

According to another aspect, the present invention provides a color conversion device for converting color data defined in a first colorimetric system into color data in a second colorimetric system, the device comprising: color data input means for inputting color data defined in a first colorimetric system; adjustment input means for inputting a desired color adjustment amount; table storing means for storing a predetermined table in which first parameters defined in the first colorimetric system and second parameters defined in a second colorimetric system are stored in correspondence with each other at a predetermined relationship; characteristic value storing means for storing a predetermined characteristic value indicative of a relationship between the first and second parameters stored in the table; changing means for changing the predetermined characteristic value based on the inputted color adjustment amount; and conversion means for converting the inputted color data from the first colorimetric system to the second colorimetric system based on both the table and the changed characteristic value.

BRIEF DESCRIPTION OF THE DRAWINGS

The above and other objects, features and advantages of the invention will become more apparent from reading the following description of the preferred embodiment taken in connection with the accompanying drawings in which:

FIG. 6 illustrates a look up table in the present embodiment; and

DETAILED DESCRIPTION OF THE PRESENT INVENTION

Figure 1:
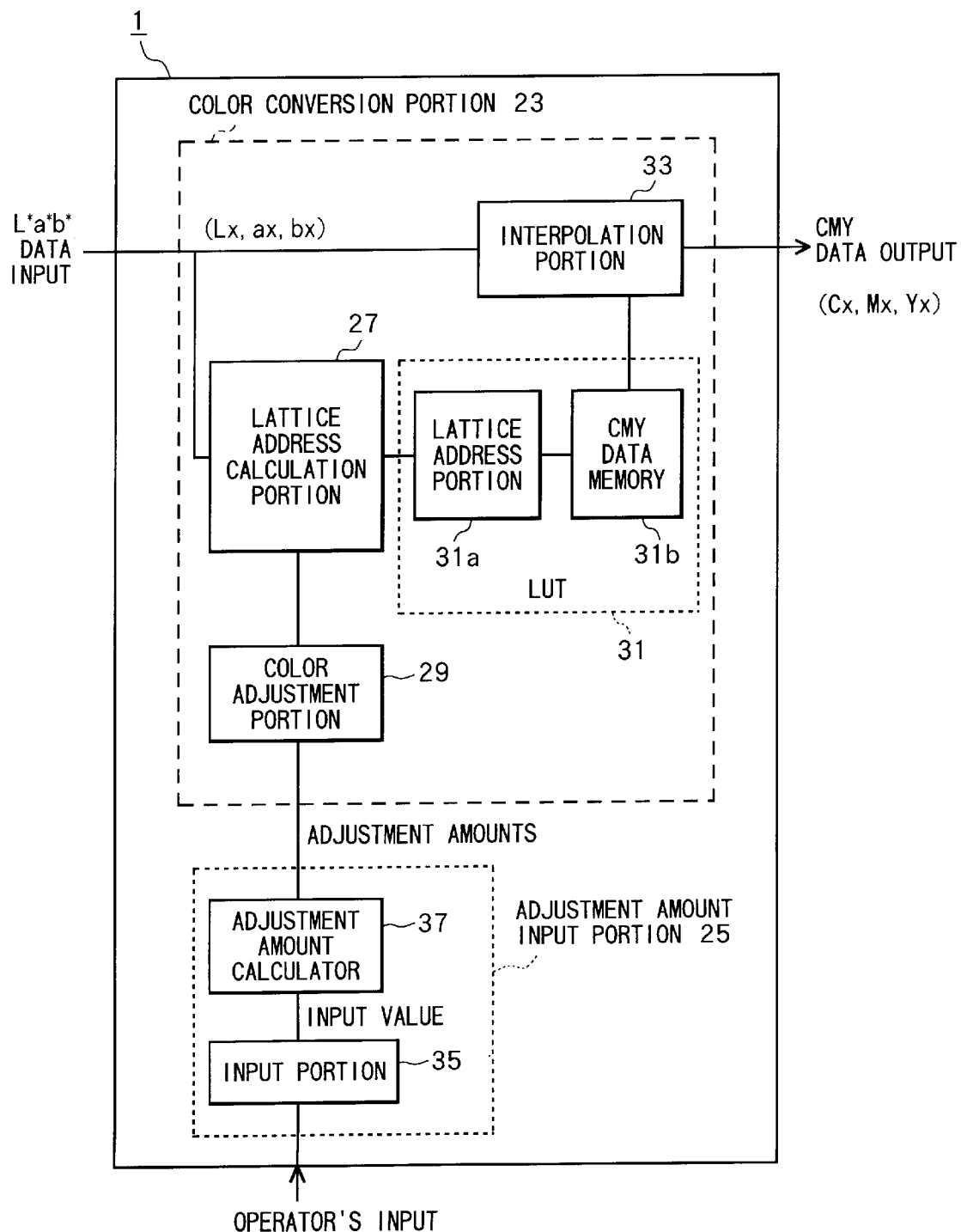
FIG. 1 is a functional block diagram of a color adjustment and conversion device of a preferred embodiment according to the present invention.

A mechanism of the color conversion method of the present invention will be first described.

According to the present invention, color data in a first colorimetric system is converted into color data in a second colorimetric system in accordance with parameters stored in a look up table. The look up table previously stores therein first parameters defined in the first colorimetric system and second parameters defined in the second colorimetric system in correspondence with each other at a certain relationship defined by predetermined characteristic values.

When a user sets his/her desired color adjustment amounts, the characteristic values are adjusted based on the user's set color adjustment amounts. Color data in the first colorimetric system is converted into color data in the second colorimetric system in accordance with both the parameters in the look up table and the adjusted characteristic values. Thus, the color data is converted from the first colorimetric system into the second colorimetric system while being adjusted according to the user's desired adjustment amounts.

According to the present invention, the look up table is not changed. Only the characteristic values, indicative of the relationship between the first and second parameters in the look up table are changed. Because the large amount of data in the look up table is not changed, the entire process can be achieved within a short period of time.

For example, the first parameters stored in the look up table are comprised of a plurality of sets of first parameters. Each first parameter set is constructed from three first parameter values indicative of a point defined in a three-dimensional coordinate space. The characteristic values indicates how the first parameter sets are distributed in a three-dimensional coordinate space of the first colorimetric system. In more concrete terms, the characteristic values may include a value indicative of a position, in the three-dimensional coordinate space, where a point indicated by a certain set of first parameter values is located. This position will be referred to as an "original position" hereinafter. For example, the original position indicates a point where a first parameter set (0, 0, 0) stored in the look up table is located in the first colorimetric system. The characteristic values may further include another value indicative of an interval, with which points indicated by the respective sets of first parameters are arranged. The interval indicates a distance between every two adjacent points indicated by the sets of first parameters. The interval will be referred to as a lattice interval because the first parameter sets are distributed in lattice points of a lattice defined in the three-dimensional coordinate space of the first colorimetric system.

It is noted that the color adjustment amounts may be set in a third colorimetric system different from both the first and second colorimetric systems. Preferably, the third colorimetric system may a colorimetric system, such as the HVC colorimetric system and a L*c*H° colorimetric system, which is defined by three color features: hue, value (lightness), and chroma (saturation). Because the third colorimetric system is defined in accordance with the human visual sense, the user can easily judge a color state of the color data and can accurately adjust the color state.

The first colorimetric system may define a uniform color space. For example, the first colorimetric system may be a CIE 1976 L*a*b colorimetric system, a CIE 1976 L*u*v* colorimetric system, or the like. In this case, the calculations employed in the conversion operation can be made simpler. The conversion operation can be achieved within a short period of time.

In order to attain the above-described color conversion method, a color conversion device includes a color data input portion for inputting color data defined in the first colorimetric system. The device also includes an adjustment input portion for inputting the user's desired color adjustment amounts. The device previously stores a look up table in which first parameters defined in the first colorimetric system and second parameters defined in the second colorimetric system are stored in correspondence with each other at a predetermined relationship. The device further stores characteristic values indicative of the relationship between the first and second parameters stored in the look up table. When inputted with the desired color adjustment amounts, the device changes the characteristic values based on the inputted color adjustment amounts. The device then converts the inputted color data from the first colorimetric system to the second colorimetric system based on both the parameters stored in the look up table and the changed characteristic values.

A color adjustment and conversion device according to a preferred embodiment of the present invention will be described while referring to FIGS. 1 through 7 wherein like parts and components are designated by the same reference numerals to avoid duplicating description.

FIG. 1 shows a functional block diagram of the color adjustment and conversion device of the present embodiment. The color adjustment and conversion device 1 is for receiving Lab color data (Lx, ax, bx) defined in the L*a*b* colorimetric system, and then converting the Lab color data into CMY color data defined in the CMY colorimetric system while adjusting the color data into a user's desired color state.

As shown in FIG. 1, the color adjustment and conversion device 1 includes: a color conversion portion 23 for converting an inputted Lab color data set (Lx, ax, bx) into a CMY color data set (Cx, Mx, Yx); and a color adjustment input portion 25 for determining a user's desired color state.

More specifically, the color adjustment input portion 25 includes: an input portion 35 for receiving the user's designated color adjustment amounts $\Delta L$, $\Delta C$, $\Delta RG$, and $\Delta YB$; and an adjustment amount calculation portion 37 for multiplying proper amounts of coefficients to the adjustment amounts $\Delta L$, $\Delta C$, $\Delta RG$, and $\Delta YB$ if necessary. The input portion 35 requests the user to input his/her desired color adjustment amounts $\Delta L$, $\Delta C$, $\Delta RG$, and $\Delta YB$ in accordance with the Munsell colorimetric system which is determined in correspondence with a human visual sense. The color adjustment amounts $\Delta L$, $\Delta C$, $\Delta RG$, and $\Delta YB$ are amounts with which the user desires to adjust lightness, vividness, and hue of the inputted color data, respectively. The adjustment amount calculation portion 37 multiplies the user's designated adjustment amounts $\Delta L$, $\Delta C$, $\Delta RG$, and $\Delta YB$ with proper amounts of coefficients c1, c2, c3, and c4 when the coefficient-multiplied amounts $c1\Delta L$, $c2\Delta C$, $c3\Delta RG$, and $c4\Delta YB$ will more properly represent the user's desired color states. The portion 37 therefore outputs the adjustment amounts $\Delta L$, $\Delta C$, $\Delta RG$, and $\Delta YB$ or the coefficient-multiplied adjustment amounts $c1\Delta L$, $c2\Delta C$, $c3\Delta RG$, and $c4\Delta YB$.

The color conversion portion 23 includes: a lattice address calculation portion 27; a color adjustment portion 29; a look up table (LUT) 31; and an interpolation processing portion 33.

The LUT 31 stores therein a plurality of Lab discrimination number sets (Lgrid, agrid, bgrid) indicative of a plurality of Lab parameter sets defined in the L*a*b* colorimetric system. The LUT 31 further stores therein a plurality of CMY parameter sets (Ci, Mi, Yi) defined in the CMY colorimetric system. The LUT 31 stores the Lab discrimination number sets (Lgrid, agrid, bgrid) and the CMY parameter sets (Ci, Mi, Yi) in correspondence with each other at a predetermined relationship defined by predetermined LUT characteristic values. Each CMY parameter set (Ci, Mi, Yi) is determined as a control signal for reproducing the same color as that indicated by the corresponding Lab discrimination number set (Lgrid, agrid, bgrid) in the L*a*b* colorimetric system.

It is noted that the LUT 31 is comprised of a lattice address portion 31a and a CMY data memory 31b. The plural Lab discrimination number sets (Lgrid, agrid, bgrid) are stored as respective addresses in the lattice address portion 31a. A CMY parameter set (Ci, Mi, Yi), corresponding to each Lab discrimination number set (Lgrid, agrid, bgrid), is stored in an address in the CMY data memory 31b corresponding to the address of the Lab discrimination number set (Lgrid, agrid, bgrid) in the lattice address portion 31a.

The plurality of Lab discrimination number sets (Lgrid, agrid, bgrid) serve to indicate a plurality of lattice points distributed in a three-dimensional L*a*b* colorimetric system space.

The color adjustment portion 29 is for adjusting the LUT characteristic values in accordance with the adjustment amounts $\Delta L$, $\Delta C$, $\Delta RG$, and $\Delta YB$ or the coefficient-multiplied adjustment amounts $c1\Delta L$, $c2\Delta C$, $c3\Delta RG$, and $c4\Delta YB$ supplied from the adjustment amount calculation portion 37.

The lattice address calculation portion 27 is for calculating Lab discrimination number sets indicative of eight lattice points that surround a color point indicated by the inputted Lab color data (Lx, ax, bx). The portion 27 calculates the Lab discrimination number sets based on the adjusted LUT characteristic values supplied from the color adjustment portion 29.

When receiving the Lab discrimination number sets indicative of the eight lattice points, the lattice address portion 31a searches eight addresses where the calculated Lab discrimination number sets are stored. Referring to the searched addresses, the lattice address calculation portion 27 controls the CMY data memory 31b to output eight CMY parameter sets which are stored in the CMY data memory 31b at the corresponding addresses. The outputted eight CMY parameter sets are supplied to the interpolation processing portion 33.

The interpolation processing portion 33 is for interpolating the supplied eight CMY parameter sets, thereby obtaining a CMY control data set (Cx, Mx, Yx) for the inputted Lab color data (Lx, ax, bx). The color adjustment and conversion device 1 outputs the obtained CMY control data (Cx, Mx, Yx).

With the above-described structure, the user determines his/her desired color states in accordance with the color system determined in accordance with the human visual sense. Based on the user's determination, the color adjustment input portion 25 determines the color adjustment amounts $\Delta L$, $\Delta C$, $\Delta RG$, and $\Delta YB$ or the coefficient-multiplied adjustment amounts $c1\Delta L$, $c2\Delta C$, $c3\Delta RG$, and $c4\Delta YB$. The color adjustment portion 29 then adjusts the LUT characteristic values based on the color adjustment amounts $\Delta L$, $\Delta C$, $\Delta RG$, and $\Delta YB$ or the coefficient-multiplied adjustment amounts $c1\Delta L$, $c2\Delta C$, $c3\Delta RG$, and $c4\Delta YB$. Based on the adjusted LUT characteristic values and the inputted Lab color data (Lx, ax, bx), the lattice address calculation portion 27 determines eight sets of Lab discrimination number sets (Lgrid, agrid, bgrid) that surround the input Lab data (Lx, ax, bx). The lattice address calculation portion 27 then selects eight CMY parameter sets (Ci, Mi, Yi) out of the CMY data memory 31b in accordance with the determined Lab discrimination number sets (Lgrid, agrid, bgrid). Receiving the eight CMY parameter sets (Ci, Mi, Yi), the interpolation processing portion 33 calculates a CMY control data set (Cx, Mx, Yx) based on the received eight CMY parameter sets (Ci, Mi, Yi) and the inputted color data set (Lx, ax, bx).

Thus, the color adjustment and conversion device 1 converts the Lab color data (Lx, ax, bx) into CMY color data (Cx, Mx, Yx) while adjusting the color state of the color data.

One example of the color adjustment and conversion device 1 will be described below while referring to FIGS. 2 through 7. The color adjustment and conversion device 1 of this example is constructed from a computer for performing calculation processings.

The color adjustment and conversion device 1 of this example is provided for receiving RGB color data defined in the RGB colorimetric system, converting the RGB color data into Lab color data defined in the L*a*b* colorimetric system, and then converting the Lab color data into CMY color data defined in the CMY colorimetric system while adjusting the color data into a user's desired color state.

Figure 2:
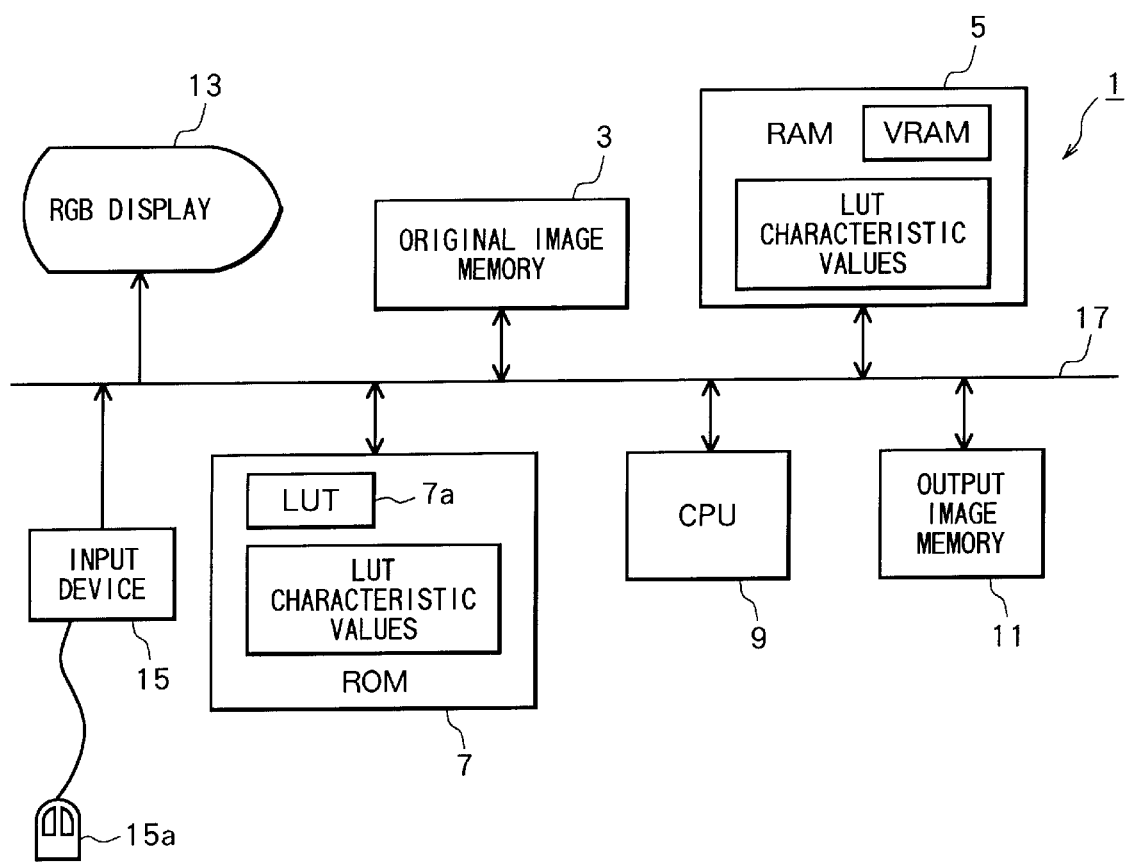
FIG. 2 is a block diagram of one example of the color adjustment and conversion device of the first preferred embodiment which is constructed from a computer.

As shown in FIG. 2, the color adjustment and conversion device 1 includes: an original image memory 3 for storing color data of an inputted original image; a RAM 5 for storing calculated results; a ROM 7 for storing data and various process programs; a CPU 9 for performing various processes onto the inputted color data; an output image memory 11 for storing the adjusted-and-converted color data; an RGB display 13 for displaying various information; and an input device 15 provided with a mouse 15a for inputting various data. All these elements are electrically connected with one another via a bus line 17.

The ROM 7 previously stores therein an RGB-L*a*b* color conversion process program, a color adjustment process program, and an L*a*b*-CMY color conversion process program. The ROM 7 further stores therein a look up table used for performing the L*a*b*-CMY color conversion process. The look up table will be referred to as LUT 7a hereinafter. The ROM 7 also stores therein LUT characteristic values "Lspace,""aspace," "bspace," "Lmin," "amin," and "bmin" for the LUT 7a.

The RAM 5 is for storing therein newly-adjusted LUT characteristic values "a'space," "b'space," "L'min," "a'min," "and "b'min" which are obtained during a color adjustment process as will be described later. The RAM 5 is also formed with a video RAM (VRAM) region for controlling the RGB display 13 to show various screen images.

The LUT 7a will be described below in a greater detail.

A three-dimensional L*a*b* colorimetric system space is defined as a color space where an L axis, an a* axis, and a b* axis extend perpendicularly to one another. The L*a*b* colorimetric system space is divided by a lattice into a plurality of rectangular parallelepipeds. Vertex points of the plural rectangular parallelepipeds are arranged as a plurality of lattice points. The plural lattice points are numbered from 0 to m along each of the L axial direction, the a* axial direction, and the b* axial direction. The plural lattice points are therefore numbered by a plurality of discrimination number sets (0, 0, 0), (0, 0, 1), (0, 0, 2), . . . , and (m, m, m). Each of the plural lattice points has a coordinate (L*, a*, b*) defined in the three-dimensional L*a*b* space. The lattice point, indicated by the discrimination number set (0, 0, 0), is defined as an original point. This lattice point has a coordinate value set (Lmin, amin, bmin) defined in the L*a*b* color space. These values "Lmin," "amin," and "bmin" are stored in the ROM 7 as the LUT characteristic values.

The lattice points are arranged at an interval "Lspace" along the L axial direction, at another interval "aspace" along the a axial direction, and at still another interval "bspace" along the b axial direction. The values "Lspace," "aspace," and "bspace" are defined in the L*a*b* colorimetric space. In other words, every two lattice points, which are adjacent with each other along the L axial direction and which are indicated by discrimination number sets (Lgrid, agrid, bgrid) and (Lgrid+1, agrid, bgrid) where 0≦Lgrid≦m−1, 0≦agrid≦m, 0≦bgrid≦m, are separated by the interval "Lspace." Every two lattice points, which are adjacent with each other along the a axial direction and which are indicated by discrimination number sets (Lgrid, agrid, bgrid) and (Lgrid, agrid+1, bgrid) where 0≦Lgrid≦m, 0≦agrid≦m−1, 0≦bgrid≦m, are separated by the interval "aspace." Every two lattice points which are adjacent with each other along the b* axial direction and which are indicated by discrimination number sets (Lgrid, agrid, bgrid) and (Lgrid, agrid, bgrid+1) where 0≦Lgrid≦m, 0≦agrid≦m, 0≦bgrid≦m−1, are separated by the interval "bspace." These interval values "Lspace," "aspace," and "bspace" are also stored in the ROM 7 as the LUT characteristic values.

FIG. 6 shows the LUT 7a in which the above-described plurality of discrimination number sets (Lgrid, agrid, bgrid) are arranged as addresses where 0≦Lgrid≦m, 0≦agrid≦m, 0≦bgrid≦m. The LUT 7a also stores therein a plurality of sets of CMY values (Ci, Mi, Yi) where 1≦i≦n in correspondence with the plurality of addresses. In more concrete terms, the look up table stores therein CMY value sets (C1, M1, Y1), (C2, M2, Y2), . . . , and (Cn, Mn, Yn) at the respective addresses (0, 0, 0), (0, 0, 1), (0, 0, 2), . . . , and (m, m, m). Each set of CMY values (Ci, Mi, Yi) is determined as a control signal for controlling an output device (not shown), connected to the device 1, to reproduce the same color as that of a lattice point defined in the L*a*b* color space by the corresponding discrimination number set (Lgrid, agrid, bgrid).

Thus, the LUT 7a stores therein Lab parameters (Lgrid, agrid, bgrid) defined in the L*a*b* colorimetric system and CMY parameters (Ci, Mi, Yi) defined in the CMY colorimetric system so that these parameters are distributed discretely.

The color adjustment and conversion device 1 is connected to an image pick up device (not shown). The image pick up device picks up an original image, and produces a plurality of sets of RGB color data (Rx, Gx, Bx) indicative of color states of a plurality of picture elements of the original image. The RGB color data sets (Rx, Gx, Bx) are defined in the RGB colorimetric system. The color adjustment and conversion device 1 receives, from the image pick up device, the plurality of RGB color data sets (Rx, Gx, Bx) of the original image. The thus inputted RGB color data sets (Rx, Gx, Bx) are temporarily stored in the RAM 5. The plurality of RGB color data sets (Rx, Gx, Bx) are also subjected to an RGB-L*a*b* color conversion process into a plurality of Lab color data sets (Lx, ax, bx) which are defined in the L*a*b* colorimetric system. The CPU 9 performs this RGB-L*a*b* color conversion process through executing the RGB-L*a*b* color conversion process program stored in the ROM 7. Thus converted Lab color data sets (Lx, ax, bx) are stored in the original image memory 3.

As will be described below, the CPU 9 then executes the color adjustment process program to adjust the LUT characteristic values "aspace," "bspace," "Lmin," "amin," and "bmin" into adjusted values "a'space," "b'space," "L'min," "a'min," and "b'min." The CPU 9 further executes the L*a*b*-CMY color conversion process program onto the Lab color data sets (Lx, ax, bx) with using the Lab parameters (Lgrid, agrid, bgrid) and the CMY parameters (Ci, Mi, Yi) stored in the LUT 7a and the adjusted LUT characteristic values "a'space," "b'space," "L'min," "a'min," and "b'min."

During the color adjustment process, the color adjustment and conversion device 1 requests a user to input his/her desired color adjustment amounts ΔRG, ΔYB, ΔL, and ΔC. Upon receipt of the inputted color adjustment amounts ΔRG, ΔYB, ΔL, and ΔC, the CPU 9 adjusts the LUT characteristic values "aspace," "bspace," "Lmin," "amin," and "bmin". The CPU 9 temporarily stores the adjusted LUT characteristic values "a'space," "b'space," "L'min," a'min," and "b'min" in the RAM 5.

During the L*a*b*-CMY color conversion process, the CPU 9 converts the Lab color data sets (Lx, ax, bx) of the original image into a plurality of CMY control data sets (Cx, Mx, Yx), defined in the CMY colorimetric system, with using the Lab parameters (Lgrid, agrid, bgrid) and the CMY parameters (Ci, Mi, Yi) in the LUT 7a and the adjusted look up table characteristic values "a'space," "b'space," "L'min," "a'min," and "b'min."

Figure 3:
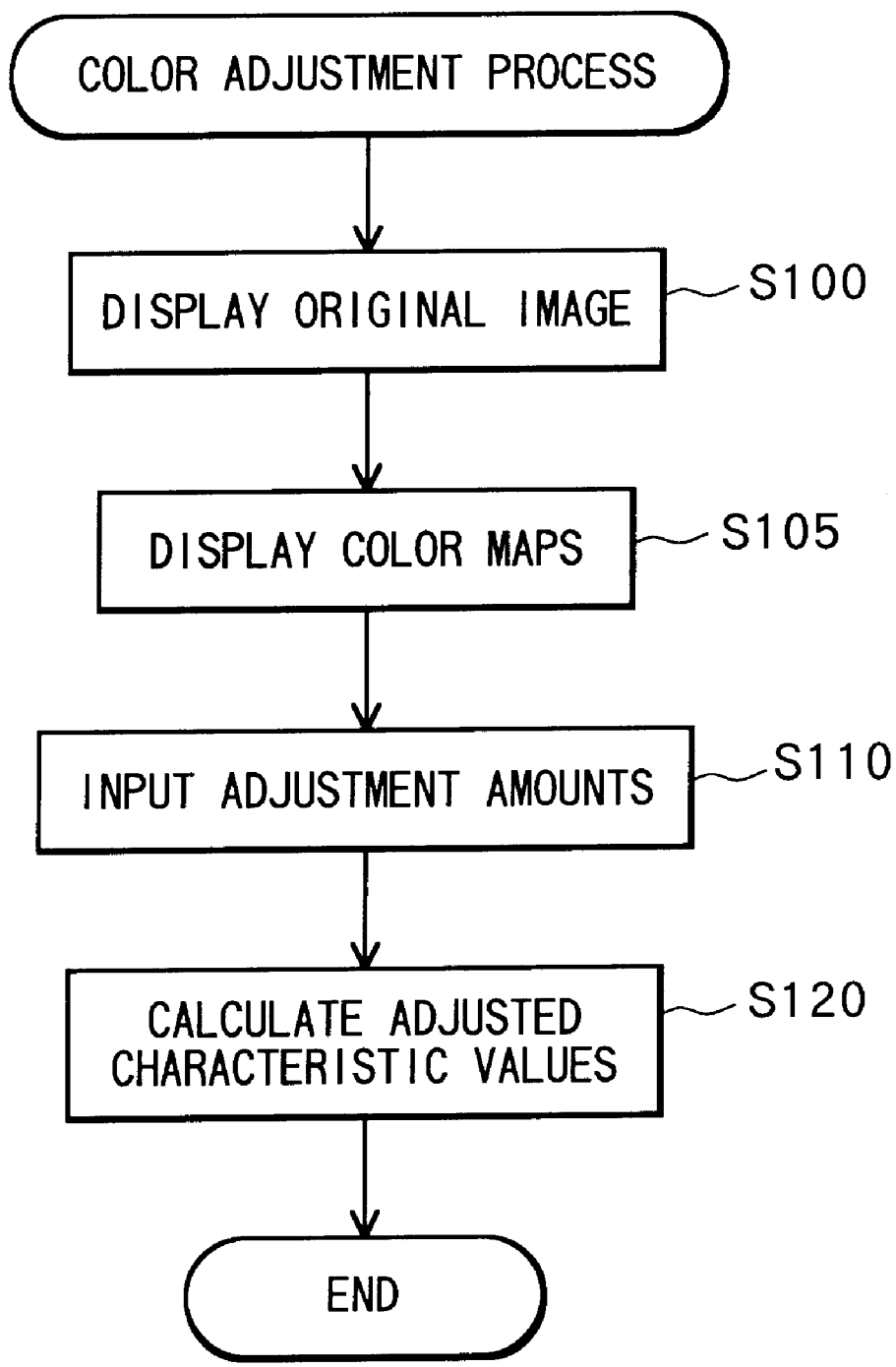
FIG. 3 is a flowchart of a color adjustment process performed by the color adjustment and conversion device of FIG. 2.

Next, the color adjustment process will be described with reference to FIG. 3, and the color conversion process will be described with reference to FIG. 4.

It is noted that each of the red, green, and blue color components of the RGB color data (Rx, Gx, Bx) in the original image has a tone level in the range of 0 to 255. Accordingly, RGB color data (Rx, Gx, Bx) of one picture element of the original image can represent either one of 16,777,216 different colors.

In the color adjustment process, first, in S100, the RGB color data of the original image, stored in the RAM 5, is transferred to the VRAM area. The RGB display 13 is controlled to show the original image as an image to be subjected to the color adjustment process. Next, in S105, the RGB display 13 is controlled to show color maps to request the user to designate his/her desired color adjustment amounts ΔRG, ΔYB, ΔL, and ΔC by the mouse 15a.

FIGS. 5(a) through 5(c) show the color maps successively displayed on the RGB display 13. These color maps are prepared to allow the user to input his/her desired adjustment amounts ΔRG, ΔYB, ΔL, and ΔC according to the Munsell colorimetric system so that the user can easily designate his/her desired color state.

FIG. 5(a) shows a tone map first displayed on the RGB display 13. Observing this tone map, the user inputs his/her desired coloring adjustment amounts ΔRG and ΔYB to be added to the original image. When the user designates his/her desired coloring adjustment amounts ΔRG and ΔYB, the user's designated color adjustment amounts ΔRG and ΔYB will be added as a hue to an achromatic color component in the color data of the original image.

In the tone map, the horizontal axis denotes a coloring adjustment amount between red and green colors. The vertical axis denotes a coloring adjustment amount between yellow and blue colors. The user can designate his/her desired coloring adjustment amounts ΔRG and ΔYB by distances of a black point from a white point (original point) in the horizontal and vertical directions. In more concrete terms, the user moves a mouse cursor (black point) in this two-dimensional coordinates to his/her desired point, and clicks a left-hand button of the mouse, thereby designating his/her desired coloring adjustment amounts ΔRG and ΔYB.

When the user desires to intensify a red coloring amount of the original color image, the user locates the black point in a red side (right side in the drawing) with respect to the original position. The red coloring of the original image will be increased with an amount corresponding to a distance ΔRG (>0) between the black point and the original point in the horizontal direction.

When the user desires to intensify the green coloring amount of the original color image, on the other hand, the user locates the black point in a green side (left side) with respect to the original position. The green coloring of the original image will be increased with an amount corresponding to a distance ΔRG (<0) between the black point and the original point in the horizontal direction.

When the user desires to intensify the yellow coloring amount of the original color image, the user locates the black point in an yellow side (upper side) with respect to the original position. The yellow coloring of the original image will be increased with an amount corresponding to a distance ΔYB (>0) between the black point and the original point in the vertical direction.

When the user desires to intensify the blue coloring amount of the original color image, on the other hand, the user locates the black point in a blue side (lower side) with respect to the original position. The blue coloring of the original image will be increased with an amount corresponding to a distance ΔYB (>0) between the black point and the original point in the vertical direction.

For example, when the user desires to intensify the red coloring amount and the blue coloring amount of the original color image, the user designates the black point in the red and blue sides with respect to the original position. As a result, an amount ΔRG (>0) is set as the red coloring adjustment amount, and an amount ΔYB (<0) is set as the blue coloring adjustment amount. The red coloring amount and the blue coloring amount will be intensified with the amount ΔRG (>0) and the amount ΔYB (<0).

FIG. 5(b) shows a brightness map displayed on the RGB display 13 next to the tone map of FIG. 5(a). This brightness map is constructed from a one-dimensional coordinate to request the user to input his/her desired value (lightness) amount. The one-dimensional coordinate extends from a light region to a dark region. The user's desired lightness amount is designated by a distance ΔL between the user's designated black point and the original point (white point). When the user desires to increase the value (lightness) of the original image, the user designates the black point in the light side (left side in the drawing) of the original point. When the user desires to decrease the value (lightness) of the original image, the user designates the black point in the dark side (right side) of the original point. The distance ΔL between the black point and the original point is an amount with which the user desires to adjust the lightness amount. It is noted that the distance ΔL has a positive value (>0) when the black point is located in the dark side and, has a negative value ΔL (<0) when the black point is located in the light side. FIG. 5(b) shows the case where the user desires to increase the lightness with an amount of ΔL (<0).

FIG. 5(c) shows a vividness map displayed on the RGB display 13 next to the brightness map of FIG. 5(b). This map is constructed from a one-dimensional coordinate to request the user to input his/her desired vividness (chroma or saturation) amount. The one-dimensional coordinate extends from a vivid region to a dull region. The user's desired vividness amount is designated by a distance ΔC between the user's designated black point and the original point (white point). When the user desires to increase the vividness (chroma) of the original image, the user designates the black point in the vivid side (left side in the drawing) of the original point. When the user desires to decrease the vividness of the original image, the user designates the black point in the dull side (right side) of the original point. The distance ΔC between the black point and the original point is an amount with which the user desires to adjust the vividness amount. It is noted that the distance ΔC has a positive value (>0) when the black point is located in the dull side, and has a negative value ΔC<0 when the black point is located in the vivid side. FIG. 5(c) shows the case where the user desires to decrease the vividness with an amount of ΔC (>0).

The user inputs his/her desired color adjustment amounts ΔRG, ΔYB, ΔL, and ΔC as described above in S110. Then, the CPU 9 calculates the following formulas (1)–(5) to thereby adjust the LUT characteristic values Lmin, amin, bmin, aspace, and bspace into adjusted LUT characteristic values L'min, a'min, b'min, a'space, and b'space in S120.

$$L'min = Lmin + \Delta L \tag{1}$$

$$a'space = aspace + \Delta C \tag{2}$$

$$b'space = bspace + \Delta C \tag{3}$$

$$a'min = (amin/aspace) \cdot a'space - \Delta RG \tag{4}$$

$$b'min = (bmin/bspace) \cdot b'space - \Delta YB \tag{5}$$

These adjusted characteristic values L'min, a'min, b'min, a'space, and b'space are stored in the RAM 5.

It is noted that the remaining LUT characteristic value "Lspace" is not adjusted during the color adjustment process.

In the above description, the LUT characteristic values L'min, a'min, b'min, a'space, and b'space are adjusted directly by the user's designated adjustment amounts ΔRG, ΔYB, ΔL, and ΔC. However, the user's designated adjustment amounts ΔL, ΔC, ΔRG, and ΔYB may be multiplied with proper amounts of coefficients c1, c2, c3 and c4 when the unit lengths of the color maps are improper for the equations (1)–(5) and therefore the coefficient-multiplied adjustment amounts c1ΔL, c2ΔC, c3ΔRG, and c4ΔYB can more properly represent the user's desired color state. In this case, the coefficient-multiplied adjustment amounts c1ΔL, c2ΔC, c3ΔRG, and c4ΔYB are used in S120 to adjust the LUT characteristic values through the following formulas (1)' through (5)':

$$L'min = Lmin + c1 \cdot \Delta L \tag{1'}$$

$$a'space = aspace + c2 \cdot \Delta C \tag{2'}$$

$$b'space = bspace + c2 \cdot \Delta C \tag{3'}$$

$$a'min = (amin/aspace) \cdot a'space - c3 \cdot \Delta RG \tag{4'}$$

$$b'min = (bmin/bspace) \cdot b'space - c4 \cdot \Delta YB \tag{5'}$$

Thus obtained set of values L'min, a'min, and b'min are indicative of an adjusted L*a*b* coordinate value of the original lattice point indicated by the discrimination number set (0, 0, 0) in the LUT 7a. The obtained value a'space is indicative of an adjusted interval between the adjacent lattice points along the a* axial direction. The obtained value b'space is indicative of an adjusted interval between the adjacent lattice points along the b axial direction. These adjusted values L'min, a'min, b'min, a'space, and b'space are all defined in the L*a*b* colorimetric space.

Figure 4:
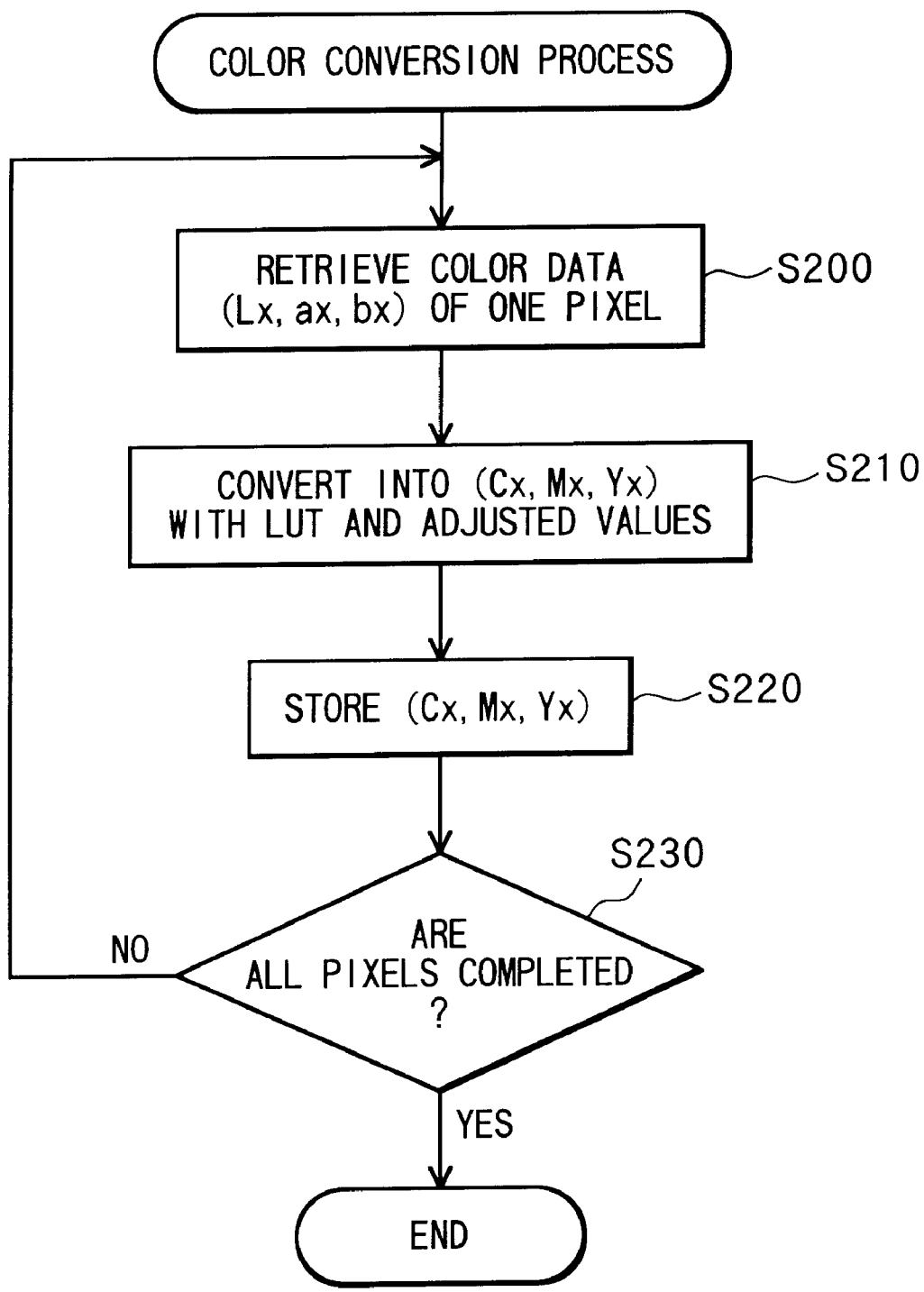
FIG. 4 is a flowchart of a color conversion process performed by the color adjustment and conversion device of FIG. 2.
Figure 5:
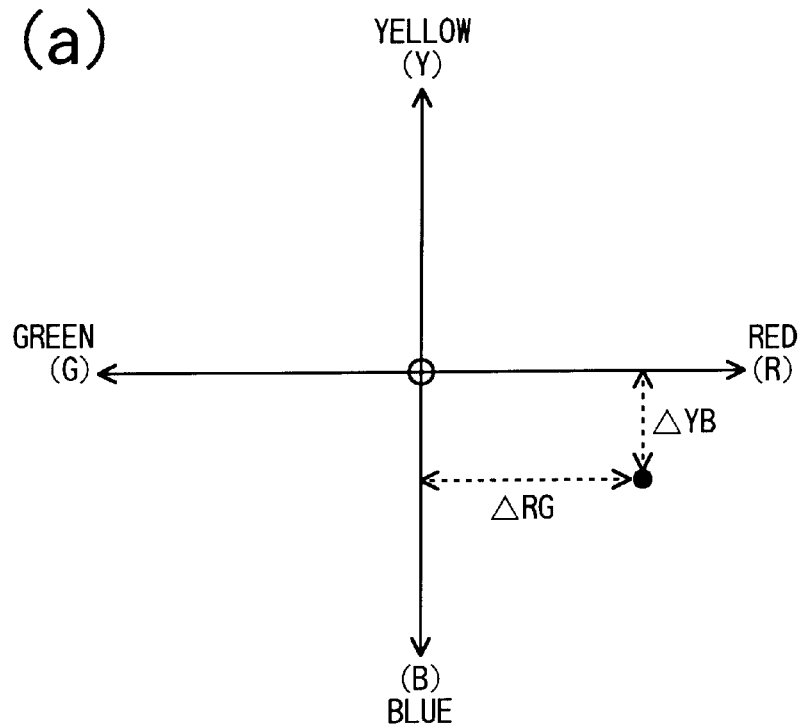
FIG. 5(a) illustrates a tone map first displayed on the RGB display 13.
FIG. 5(b) illustrates a brightness map displayed on the RGB display 13 next to the map of FIG. 5(a)
FIG. 5(c) illustrates a vividness map displayed on the RGB display 13 next to the map of FIG. 5(b)
Figure 5:
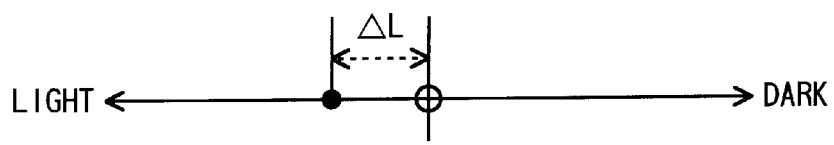
Figure 5:
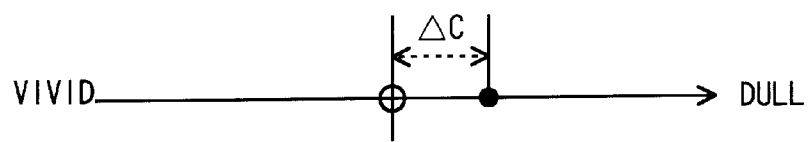

When the color adjustment process is thus completed, the color conversion process is achieved as shown in FIG. 4.

During the color conversion process, the CPU 9 first retrieves one pixel's worth of Lab color data (Lx, ax, bx) from the original image memory 3 and writes the retrieved Lab color data (Lx, ax, bx) into the work area of the RAM 5 in S200.

Next, in S210, the CPU 9 converts the Lab color data (Lx, ax, bx) into CMY control data (Cx, Mx, Yx) with using the LUT 7a and the adjusted characteristic values L'min, a'min, b'min, a'space, and b'space in a manner described below.

It is noted the adjusted intervals a'space and b'space indicate that the Lab parameters (Lgrid, agrid, bgrid) in the LUT 7a where 0≦Lgrid≦m, 0≦agrid≦m, 0≦bgrid≦m are now distributed with the intervals Lspace, a'space, and b'space in the L*a*b* colorimetric space.

In S200, CMY parameters (Ci, Mi, Yi) in the LUT 7a are subjected to an interpolation process, whereby the CMY control data (Cx, Mx, Yx) is obtained. In more concrete terms, eight lattice points that surround a color point X indicated by the color data (Lx, ax, bx), are first determined. Then, eight sets of CMY parameters (Ci, Mi, Yi), stored in the LUT 7a at the addresses for the determined eight lattice points, are retrieved from the LUT 7a. Then, a weighted average for the eight sets of CMY parameters (Ci, Mi, Yi) is calculated through a volume interpolation method.

This calculation will be described below in greater detail.

Figure 7:
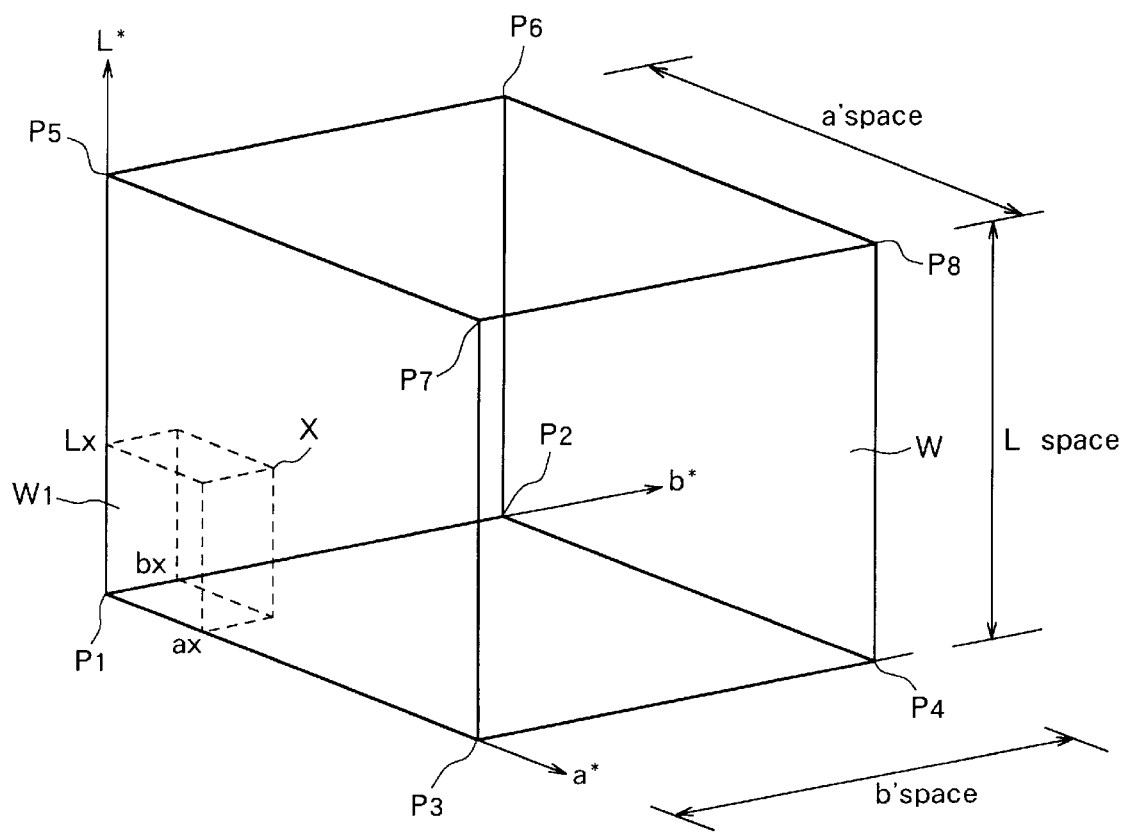
FIG. 7 illustrates how an interpolation calculation is performed in a three-dimensional L*a*b* colorimetric space.

The L*a*b* colorimetric space is divided into the plurality of rectangular parallelepipeds, one of the plurality of rectangular parallelpipeds being shown in FIG. 7. It is now assumed that the point X of the subject Lab color data (Lx, ax, bx) is located in the one rectangular parallelepiped V shown in FIG. 7 with its vertex points being referred to as P1, P2, P3, P4, P5, P6, P7, and P8. These vertex points are lattice points indicated by the discrimination number sets stored in the LUT 7a.

A discrimination number set (Lgrid, agrid, bgrid) indicative of the first vertex point P1 is represented by the following equations (6) through (8):

$$Lgrid = int\{(Lx - L'min)/Lspace\} \tag{6}$$

$$agrid = int\{(ax - a'min)/a'space\} \tag{7}$$

$$bgrid = int\{(bx - b'min)/b'space\} \tag{8}$$

wherein int{} indicates a function for calculating an integer corresponding to a value in {}. When the first vertex point P1 is determined as described above, the remaining seven vertex points P2 thorough P8 are determined. That is, the discrimination number set of the second point P2 is determined as (Lgrid, agrid, bgrid+1) because the second point P2 is adjacent to the point P1 along the b* axial direction. The discrimination number set for the third point P3 is determined as (Lgrid, agrid+1, bgrid) because the third point P3 is adjacent to the point P1 along the a* axial direction. In this manner, the discrimination number sets for the points P4, P5, P6, P7, and P8 are determined as (Lgrid, agrid+1, bgrid+1), (Lgrid+1, agrid, bgrid), (Lgrid+1, agrid, bgrid+1), (Lgrid+1, agrid+1, bgrid), and (Lgrid+1, agrid+1, bgrid+1), respectively.

It is now assumed that the LUT 7a stores therein (C1, M1, Y1), (C2, M2, Y2), (C3, M3, Y3), (C4, M4, Y4), (C5, M5, Y5), (C6, M6, Y6), (C7, M7, Y7), (C8, M8, Y8), in correspondence with the discrimination number sets (Lgrid, agrid, bgrid), (Lgrid, agrid, bgrid+1), (Lgrid, agrid+1, bgrid), (Lgrid, agrid+1, bgrid+1), (Lgrid+1, agrid, bgrid), (Lgrid+1, agrid, bgrid+1), (Lgrid+1, agrid+1, bgrid), and (Lgrid+1, agrid+1, bgrid+1), respectively.

Next, a smaller rectangular parallelepiped W1 is defined as a rectangular parallelepiped having the vertex P1 and the point X (Lx, ax, bx) as opposite or diagonal vertex points. It is now assumed that the rectangular parallelepiped W1 has a volume "a1," and the rectangular parallelepiped V has a volume "A." A weight coefficient for the vertex point P8 is calculated as a value obtained by dividing the volume "a1" by the volume "A" in a manner as described below.

First, a coordinate value (LP1, aP1, bP1) of the vertex point P1, defined in the La*b* coordinate system, is calculated. That is, the La b coordinate value (LP1, aP1, bP1) for the vertex point P1 is calculated through the following equations with using the above-described discrimination number set (Lgrid, agrid, bgrid) and the adjusted LUT characteristic values L'min, a'min, b'min, a'space, and b'space:

LP1=Lgrid•Lspace+L'min aP1=agrid•a'space+a'min bP1=bgrid•b'space+b'min

Similarly, a coordinate value (LP8, aP8, bP8) of the vertex point P8, defined in the La*b* coordinate system, is also calculated. That is, the La*b* coordinate value (LP8, aP8, bP8) for the vertex point P8 is calculated by the following formulas:

LP8=(Lgrid+1)•Lspace+L'min aP8=(agrid+1)•a'space+a'min bP8=(bgrid+1)•b'space+b'min The volume "A" of the rectangular parallelepiped V is defined in the L*a*b* coordinate system in the following formula:

$$A = (LP8 - LP1) \cdot (aP8 - aP1) \cdot (bP8 - bP1)$$
$$= \text{Lspace} \cdot \text{a'space} \cdot \text{b'space}$$

The volume "a1" of the rectangular parallelepiped WI is defined in the L*a*b* coordinate system in the following formula:

$$a1 = (Lx - LP1) \cdot (ax - aP1) \cdot (bx - bP1)$$

In the similar manner as described above, small rectangular parallelepipeds W2 through W8 are defined to have the vertex point X and the vertex points P2 through P8 as the diagonal or opposite vertex points. Weight coefficients for the vertex points opposite to the vertex points P2 through P8 are respectively obtained by dividing the volumes "a2" through "a8" of the rectangular parallelepipeds W2 through W8 by the volume "A."

Then, the CMY control data (Cx, Mx, Yx) for the color point X is calculated through the following interpolation formulas (9) through (11):

$$Cx = (a1 \cdot C8 + a2 \cdot C7 + a3 \cdot C6 + a4 \cdot C5 + a5 \cdot C4 + a6 \cdot C3 + a7 \cdot C2 + a8 \cdot C1)/(A)$$

$$Mx = (a1 \cdot M8 + a2 \cdot M7 + a3 \cdot M6 + a4 \cdot M5 + a5 \cdot M4 + a6 \cdot M3 + a7 \cdot M2 + a8 \cdot M1)/A \quad (10)$$

$$Yx = (a1 \cdot Y8 + a2 \cdot Y7 + a3 \cdot Y6 + a4 \cdot Y5 + a5 \cdot Y4 + a6 \cdot Y3 + a7 \cdot Y2 + a8 \cdot Y1)/A \quad (11)$$

As described above, the discrimination number sets (Lgrid, agrid, bgrid) of the vertex points P1 through P8 are calculated based on the characteristic value Lspace originally stored in the RAM 5 and the adjusted characteristic values L'min, a'min, b'min, a'space, and b'space. Accordingly, the CMY control data set (Cx, Mx, Yx) is obtained based on the user's designated color adjustment amounts ΔL, ΔC, ΔRG, and ΔYB.

When the color conversion process for the subject pixel (Lx, ax, bx) is completed in S210, the obtained CMY control data (Cx, Mx, Yx) is stored in the output image memory 11 in S220.

Next, it is judged in S230 whether or not all the pixels' worth of color data (Lx, ax, bx) have been subjected to the color conversion process. When any pixels have not yet been subjected to the color conversion process (no in S230), the process returns to S200, wherein the remaining pixels are subjected to the color conversion process. On the other hand, when all the pixels of the original color image have been subjected to the color conversion process (yes in S230), the color conversion process is completed.

As described above, according to the present invention, it is unnecessary to adjust all the CMY parameters in the LUT 7a. The CPU 9 merely adjusts the look up table characteristic values Lmin, amin, bmin, aspace, and bspace according to the user's inputted color adjustment amounts ΔL, ΔC, ΔRG, and ΔYB. During the color conversion process, the discrimination number sets (Lgrid, agrid, bgrid), . . . for the vertex points P1 through P8 that surround the color data of the original image are determined by the adjusted LUT characteristic values L'min, a'min, b'min, a'space, and b'space. The interpolation calculations are then performed with using the thus determined discrimination number sets (Lgrid, agrid, bgrid), . . . . Accordingly, the color conversion process can properly convert the original color data (Lx, ax bx) into control data (Cx, Mx, Yx) with using the user's desired color adjustment amounts ΔL, ΔC, ΔRG, and ΔYB.

The color adjustment and conversion device 1 can perform the user's desired color adjustment operation through achieving the simple calculations (1) through (5) (or (1)' through (5)'). The color adjustment and conversion device 1 can therefore easily perform the color adjustment operation within a short period of time. The color adjustment and conversion device 1 can perform color conversion operation with the user's desired color adjustment amounts to obtain proper control data within a short period of time. The control data will be supplied to the output device (not shown) to be printed out.

During the color adjustment amount input process, the user determines his/her desired color adjustment amounts ΔL, ΔC, ΔRG, and ΔYB according to the Munsell colorimetric system. The user can easily determine his/her desired adjustment amounts because the Munsell colorimetric system is determined in accordance with the human visual sense.

While the invention has been described in detail with reference to the specific embodiment thereof, it would be apparent to those skilled in the art that various changes and modifications may be made therein without departing from the spirit of the invention.

In the above-described embodiment, the color adjustment and conversion device converts color data in the L*a*b* colorimetric system into control data in the CMY colorimetric system. However, the color adjustment and conversion device can be modified so as to be capable of converting color data in any colorimetric system into color data in another colorimetric system. The color adjustment and conversion device can thus convert color data between various colorimetric systems such as the L*a*b* colorimetric system, the RGB colorimetric system, the RGBK colorimetric system, the XYZ colorimetric system, the CMY colorimetric system, the L*u*v* colorimetric system, and the L*c*H° colorimetric system.

What is claimed is:

1. A color converting method for converting color data from a first colorimetric system into a second colorimetric system, the method comprising the steps of:

inputting a desired color adjustment amount;

changing, dependently on the inputted color adjustment amount, a characteristic value indicative of relationship between first parameters defined in a first colorimetric system and second parameters defined in a second colorimetric system stored in a predetermined table, without changing the first parameters or the second parameters in the predetermined table, the characteristic value indicating a positional characteristic how the first parameters are arranged in a coordinate space defined for the first colorimetric system; and converting color data, defined in the first colorimetric system, into color data in the second colorimetric system, through an interpolation process, in accordance with the unchanged first parameters that are arranged in the coordinate space according to the changed characteristic value and in accordance with the unchanged second parameters that are stored in the predetermined table in correspondence with the unchanged first parameters, thereby adjusting the color state of the color data according to the inputted color adjustment amount.

2. A color converting method as claimed in claim 1, wherein the predetermined table stores therein a plurality of sets of second parameters in correspondence with a plurality of sets of first parameters, each set of first parameters including three values indicative of a corresponding color point defined in a three-dimensional coordinate space, wherein the characteristic value includes:
  a positional value indicative of an original position, in the three-dimensional coordinate space, where a color point indicated by a predetermined set of first parameter values is located; and
  an interval value indicative of an interval, at which a plurality of color points indicated by the respective sets of first parameters are arranged in the three-dimensional coordinate space, the changing step changing at least one of the positional value and the interval value, wherein the converting step includes the steps of:
  searching eight sets of first parameters indicative of eight color points that surround a color point indicated by the color data of the first colorimetric system in the three-dimensional coordinate space the searching step performing the searching operation using the positional value and the interval value, at least one of which is changed by the changing step;
  selecting eight sets of second parameters that are stored in the predetermined table in correspondence with the searched eight sets of first parameters;
  calculating eight weight coefficients based on the positional value and the interval value, at least one of which is changed by the changing step; and
  calculating the color data of the second colorimetric system through interpolating the selected eight sets of second parameters using the calculated eight coefficients.

3. A color converting method as claimed in claim 1, wherein the color adjustment amount is defined in a third colorimetric system different from both the first and second colorimetric systems.

4. A color converting method as claimed in claim 1, wherein the converting step includes the steps of:
  searching, using the changed characteristic value, several first parameters that indicate several color points surrounding a color point indicated by the color data of the first colorimetric system in the coordinate space;
  selecting several second parameters that are stored in the predetermined table in correspondence with the searched several first parameters;
  calculating several weight coefficients based on the changed characteristic value; and
  calculating the color data of the second colorimetric system through interpolating the selected several second parameters using the calculated several weight coefficients.

5. A color converting method as claimed in claim 1, wherein the color adjustment amount inputting step includes the step of enabling a user to input his/her desired color adjustment amount, with which the color state of the color image is desired to be adjusted.

6. A color converting method as claimed in claim 1, further comprising the step of inputting color data defined in the first colorimetric system and indicative of a color image,
  wherein the color adjustment amount inputting step includes the step of inputting the desired color adjustment amount, with which a color state of the color image is desired to be adjusted, and
  wherein the color data converting step converts the inputted color data in the first colorimetric system into color data in the second colorimetric system in accordance with the table and the changed characteristic value.

7. A color converting method as claimed in claim 6, wherein the color adjustment amount inputting step includes the steps of:
  displaying the color image; and
  requesting a user to input his/her desired color adjustment amount, with which the color state of the color image is desired to be adjusted.

8. A color converting method as claimed in claim 6, wherein the color data inputting step includes the steps of:
  receiving color data indicative of the color image and defined in a fourth colorimetric system other than the first and second colorimetric systems; and
  converting the color data from the fourth colorimetric system to the first colorimetric system.

9. A color conversion device for converting color data defined in a first colorimetric system into color data in a second colorimetric system, the device comprising:
  color data input means for inputting color data defined in a first colorimetric system;
  adjustment input means for inputting a desired color adjustment amount;
  table storing means for storing a predetermined table in which first parameters defined in the first colorimetric system and second parameters defined in a second colorimetric system are stored in correspondence with each other at a predetermined relationship;
  characteristic value storing means for storing a predetermined characteristic value indicative of a relationship between the first and second parameters stored in the table, the predetermined characteristic value indicating a positional characteristic how the first parameters are arranged in a coordinate space defined for the first colorimetric system;
  changing means for changing the predetermined characteristic value based on the inputted color adjustment amount, without changing the first parameters or the second parameters in the predetermined table; and
  conversion means for converting the inputted color data from the first colorimetric system to the second colorimetric system, through an interpolation process, based on both the unchanged first parameters that are arranged in the coordinate space according to the changed characteristic value and the unchanged second parameters that are stored in the predetermined table in correspondence with the unchanged first parameters, thereby adjusting the color state of the inputted color data according to the inputted color adjustment amount.

10. A color conversion device as claimed in claim 9, wherein the predetermined table stores therein a plurality of sets of second parameters in correspondence with a plurality of sets of first parameter each set of first parameters including three values indicative of a corresponding color point defined in a three-dimensional coordinate space, wherein the characteristic value includes:
   a positional value indicative of an original position, in the three-dimensional coordinate space, where a color point indicated by a predetermined set of first parameter values is located; and
   an interval value indicative of an interval, at which a plurality of color points indicated by the respective sets of first parameters are arranged in the three-dimensional coordinate space, the changing step changing at least one of the positional value and the interval value, wherein the conversion means includes:
   means for searching eight sets of first parameters indicative of eight color points that surround a color point indicated by the inputted color data of the first colorimetric system in the three-dimensional coordinate space, the searching means performing the searching operation using the positional value and the interval value, at least one of which is changed by the changing means;
   means for selecting eight sets of second parameters that are stored in the predetermined table in correspondence with the searched eight sets of first parameters;
   means for calculating eight weight coefficients based on the positional value and the interval value, at least one of which is changed by the changing step; and
   means for calculating color data of the second colorimetric system through interpolating the selected eight sets of second parameters using the calculated eight coefficients.

11. A color conversion device as claimed in claim 9, wherein the color adjustment amount is defined in a third colorimetric system different from both the first and second colorimetric systems.

12. A color conversion device as claimed in claim 9, wherein the conversion means includes:
   means for searching, using the changed characteristic value, several first parameters that indicate several color points surrounding a color point indicated by the inputted color data of the first colorimetric system in the coordinate space;
   means for selecting several second parameters that are stored in the predetermined table in correspondence with the searched several first parameters;
   means for calculating several weight coefficients based on the changed characteristic value; and
   means for calculating color data of the second colorimetric system through interpolating the selected several second parameters using the calculated several weight coefficients.

13. A color conversion device as claimed in claim 9, wherein the adjustment input means includes means for enabling a user to input his/her desired color adjustment amount, with which the color state of the color image is desired to be adjusted.

14. A color conversion device as claimed in claim 9, wherein the color data input means inputs the color data defined in the first colorimetric system and indicative of a color image,
   wherein the adjustment input means inputs the desired color adjustment amount, with which a color state of the color image is desired to be adjusted, and
   wherein the converting means converts the inputted color data from the first colorimetric system to the second colorimetric system in accordance with the table and the changed characteristic value.

15. A color conversion device as claimed in claim 14, wherein the adjustment input means includes:
   means for displaying the color image; and
   means for requesting a user to input his/her desired color adjustment amount, with which the color state of the color image is desired to be adjusted.

16. A color conversion device as claimed in claim 9, wherein the color data input means includes:
   means for receiving color data indicative of the color image and defined in a fourth colorimetric system other than the first and second colorimetric systems; and
   means for converting the color data from the fourth colorimetric system into the first colorimetric system.

17. A color conversion device as claimed in claim 16, wherein the display means displays the color image based on the color data in the fourth colorimetric system.

18. A color conversion device for converting color data defined in a first colorimetric system into color data in a second colorimetric system, the device comprising:
   a color data input circuit that inputs color data defined in a first colorimetric system;
   a color adjuster that inputs a desired color adjustment amount;
   a first memory that stores at least a predetermined table in which first parameters defined in the first colorimetric system and second parameters defined in a second colorimetric system are stored in correspondence with each other at a predetermined relationship;
   a second memory that stores at least a predetermined characteristic value indicative of a relationship between the first and second parameters stored in the predetermined table, the predetermined characteristic value indicating a positional characteristic how the first parameters are arranged in a coordinate space defined for the first colorimetric system;
   a color changer that changes the predetermined characteristic value based on the inputted color adjustment amount, without changing the first parameters or the second parameters in the predetermined table; and
   a color converter that converts the inputted color data from the first colorimetric system to the second colorimetric system, through the interpolation process, based on both the unchanged first parameters that are arranged in the coordinate space according to the changed characteristic value and the unchanged second parameters that are stored in the predetermined table in correspondence with the unchanged first parameters, thereby adjusting the color state of the inputted color data according to the inputted color adjustment amount.

19. A color conversion device as claimed in claim 18, wherein the color adjuster includes an input unit that enables a user to input his/her desired color adjustment amount, with which the color state of the color image is desired to be adjusted.

20. A color converting method as claimed in claim 5, wherein the first colorimetric system is device independent.

21. A color conversion device as claimed in claim 13, wherein the first colorimetric system is device independent.

22. A color conversion device as claimed in claim 19, wherein the first colorimetric system is device independent.

23. A color converting method as claimed in claim 20, wherein the first colorimetric system defines a uniform color space.

24. A color conversion device as claimed in claim 21, wherein the first colorimetric system defines a uniform color space.

25. A color conversion device as claimed in claim 22, wherein the first colorimetric system defines a uniform color space.

26. A color converting method as claimed in claim 23, wherein the first colorimetric system is either one of a CIE 1976 L*a*b colorimetric system and a CIE 1976 L*u*v colorimetric system.

27. A color conversion device as claimed in claim 24, wherein the first colorimetric system is either one of a CIE 1976 L*a*b colorimetric system and a CIE 1976 L*u*v colorimetric system.

28. A color conversion device as claimed in claim 25 wherein the first colorimetric system is either one of a CIE 1976 L*a*b colorimetric system and a CIE 1976 L*u*v colorimetric system.

29. A color conversion device as claimed in claim 28, wherein the third colorimetric system is defined as a colorimetric system which is defined by color hue, color value, and color chroma.

30. A color converting method as claimed in claim 28, wherein the third colorimetric system is defined as a colorimetric system which is defined by color hue, color value, and color chroma.

31. A color conversion device as claimed in claim 29, wherein the third colorimetric system is defined as a colorimetric system which is defined by color hue, color value, and color chroma.

* * * * *